US010254183B2

(12) United States Patent
Kohler

(10) Patent No.: US 10,254,183 B2
(45) Date of Patent: Apr. 9, 2019

(54) DEVICE FOR DETECTING FORCE AND TORQUE INCLUDING MULTIPLE PIEZOELECTRIC FORCE MEASURING CELLS MECHANICALLY BIASED IN A HORIZONTAL PLANE

(71) Applicant: KISTLER HOLDING AG, Winterthur (CH)

(72) Inventor: Denis Kohler, Neftenbach (CH)

(73) Assignee: Kistler Holding AG, Winterthur (CH)

( * ) Notice: Subject to any disclaimer, the term of this patent is extended or adjusted under 35 U.S.C. 154(b) by 0 days.

(21) Appl. No.: 15/753,496

(22) PCT Filed: Jul. 25, 2016

(86) PCT No.: PCT/EP2016/067605
§ 371 (c)(1),
(2) Date: Feb. 19, 2018

(87) PCT Pub. No.: WO2017/036671
PCT Pub. Date: Mar. 9, 2017

(65) Prior Publication Data
US 2018/0245996 A1    Aug. 30, 2018

(30) Foreign Application Priority Data
Sep. 4, 2015    (EP) ..................... 15183934

(51) Int. Cl.
*G01L 1/22*    (2006.01)
*G01L 5/16*    (2006.01)

(52) U.S. Cl.
CPC ................... *G01L 5/167* (2013.01)

(58) Field of Classification Search
CPC ... G01L 5/167; H01L 41/132; H01L 41/0472; B25J 19/028
See application file for complete search history.

(56) References Cited

U.S. PATENT DOCUMENTS

| 5,821,432 A | 10/1998 | Sidler et al. |
| 9,091,607 B2 * | 7/2015 | Matsumoto ............ B25J 19/028 |
| 2015/0120051 A1 | 4/2015 | Matsuzawa et al. |

FOREIGN PATENT DOCUMENTS

EP    0 806 643 A2    11/1997

OTHER PUBLICATIONS

International Search Report (PCT/EP2016/067605), dated Oct. 4, 2016.
Opinion of International Search Authority (PCT/EP2016/067605), dated Oct. 4, 2016.
Kistler Group, Data Sheet No. 9119AA1_003_060e-01.13, MiniDyn, Multicomponent Dynamometer up to 4 000 N, Cover Plate 39×80 mm, 2013.
International Preliminary Report on Patentability (PCT/EP2016/067605), dated Mar. 6, 2018.

* cited by examiner

*Primary Examiner* — Lisa M Caputo
*Assistant Examiner* — Nigel H Plumb
(74) *Attorney, Agent, or Firm* — Dority & Manning, P.A.

(57) ABSTRACT

A device for force and torque detection includes piezoelectric force measuring cells that are mechanically biased in a horizontal working plane against end surfaces of a mounting platform and detect power components. At least one first end surface of the mounting platform is disposed obliquely to at least one second end surface.

14 Claims, 6 Drawing Sheets

DEVICE FOR DETECTING FORCE AND TORQUE INCLUDING MULTIPLE PIEZOELECTRIC FORCE MEASURING CELLS MECHANICALLY BIASED IN A HORIZONTAL PLANE

CROSS-REFERENCE TO RELATED APPLICATIONS

This application claims priority to International Application Serial No. PCT/EP2016/067605, filed Jul. 25, 2016, which claims priority to EP Application No. 15183934.7, filed Sep. 4, 2015. International Application Serial No. PCT/EP2016/067605 is hereby incorporated herein in its entirety for all purposes by this reference.

TECHNICAL FIELD

The invention relates to a device for force and moment measurement according to the preamble of the independent claim.

BACKGROUND

Machining is still the most important way of forming and is fundamental for production processes of all kinds of technical products. A detailed analysis of machining is important for the optimization of production processes. Therefore, a measurement of forces and moments is performed during machining, and the resulting information is used to quantify the energy converted during machining, determine material characteristics, analyze the wear of tools and enable a design of machine structures/components according to needs.

The document EP0806643A2A discloses a device for measuring forces and moments. The device is shown schematically in FIG. 1. On a T-shaped mounting platform 8 is mounted a workpiece 4 that is machined by a tool 5. A stem of the mounting platform 8 is supported between two legs of a U-shaped stand 9. Between each leg of the stand 9 and the stem of the mounting platform 8 is arranged a piezoelectric load cell A, B. These piezoelectric load cells A, B are mechanically preloaded by a preloading screw 10. The preloading screw 10 passes through the linearly arranged piezoelectric load cells A, B, the stem of the mounting platform 8, and the legs of the stand 9. During machining of the workpiece 4, a unidirectional force F acts in the direction of the longitudinal dimension of the preloading screw 10. The unidirectional force F is split equally between the piezoelectric load cells A, B. The piezoelectric load cell A is unloaded by a force of +½ F while the piezoelectric load cell B is loaded by a force of +½ F. Each of the piezoelectric load cells A, B comprises piezoelectric transducers. The crystallographic orientation of the piezoelectric transducers is such that a force acting thereon generates electric polarization charges. The piezoelectric transducers in load cell A have opposite polarization directions than the piezoelectric transducers in load cell B. Thus, a sum of the electric polarization charges of the piezoelectric load cells A, B is proportional to the magnitude of the force F acting on the workpiece 4 and thus acting in the opposite direction on the tool 5 with the same magnitude.

A device for force and moment measurement of this type having the type designation 9119AA1 is commercially available from Kistler Group, details are described in a data sheet No. 9119AA1_003_060e-01.13. The device comprises four piezoelectric load cells of which two are arranged on each of the sides of the stem of the mounting platform. The piezoelectric load cells measure three orthogonal force components $F_x$, $F_y$, $F_z$ of the force F. Electric polarization charges are picked up in a component-specific manner and transmitted via signal lines to a charge amplifier where they are electrically amplified and then fed to an evaluation unit where they are converted in an electrical voltage. The device is characterized by parameters such as measuring range, sensitivity, natural frequency, weight, and an overall base area. The measuring range of the device is in the range of −4 kN to +4 kN for the force components $F_x$, $F_y$, $F_z$. The sensitivity of the device is ~26 pC/N ($10^{-12}$ Coulombs/Newton) for the force components $F_x$, $F_z$ and ~13 pC/N for force component $F_y$. The natural frequency of the device is ~6.0 kHz for force component $F_x$, ~6.4 kHz for force component $F_y$ and ~6.3 kHz for force component $F_z$. It has a weight of 930 g and its overall base area is the product of respective sides measuring 109 mm by 80 mm.

However, the prior art device for force and moment measurement according to data sheet 9119AA1_003_060e-01.13 shows anisotropic sensitivity with respect to the different force components. Particularly, in a horizontal working plane of the mounting platform, the sensitivity of ~26 pC/N of the force components $F_x$ is twice as high as that of the force component $F_y$ being ~13 pC/N. Since machining is often performed in a rotationally symmetrical manner with respect to the horizontal working plane, an actual sensitivity of the device in the working plane is determined by the low sensitivity regarding force component $F_y$. Furthermore, it is desired to increase the natural frequency of the device since the lowest natural frequency $F_x$ of ~6.0 kHz restricts the use of the device to maximum spindle speeds of ~60,000 rotations per minute.

It is the object of the invention to increase at least one of the parameters of sensitivity and natural frequency of a device for force and moment measurement.

BRIEF SUMMARY OF THE INVENTION

This object has been achieved by the features described below.

The invention relates to a device for force and moment measurement comprising piezoelectric load cells that are mechanically preloaded against end surfaces of a mounting platform in a horizontal working plane and measure force components; wherein at least one first end surface of the mounting platform is arranged in an oblique relationship to at least one second end surface.

It has been found that when the piezoelectric force sensors are arranged in an oblique relationship to each other rather than in a linear alignment, it is possible to avoid the anisotropy of the sensitivity in the horizontal working plane of the mounting platform. Indeed, one of the force components is detected by a shear effect while the other force component is detected by a longitudinal effect. In this manner, the sensitivity of the shear effect is twice as high as that of the longitudinal effect. Due to the inclined arrangement of the respective piezoelectric load cells at respective end surfaces of the mounting platform, each of the two force components of the horizontal working plane is detected by the shear effect on the one hand and by the longitudinal effect on the other hand. Therefore, the device of the invention shows isotropic sensitivity in the horizontal working plane.

BRIEF DESCRIPTION OF DRAWINGS

In the following, the invention will be explained in more detail by way of examples with respect to the Figures in which.

DESCRIPTION OF EXEMPLARY EMBODIMENTS OF THE INVENTION

Figure 1:
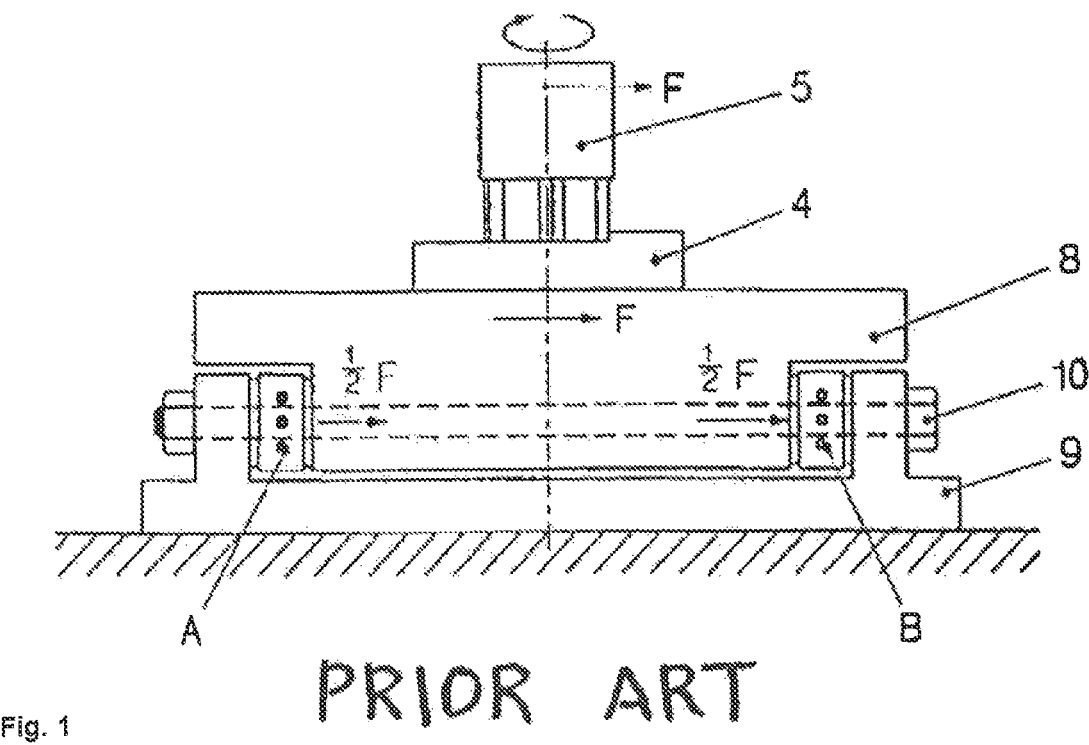
FIG. 1 is a schematic view of a known device for force and moment measurement of the prior art.

FIGS. 2 to 5 show two embodiments of a device 1 according to the invention for force and moment measurement. Device 1 is arranged in an orthogonal coordinate system having the coordinate axes x, y, z. Device 1 comprises a mounting platform 8 made of a mechanically durable and rigid material such as pure metals, nickel alloys, cobalt alloys, iron alloys, ceramics, plastics, etc. The mounting platform 8 can be mounted with a workpiece or tool. The tool and workpiece are not shown in the Figures. For machining, the mounting platform 8 may thus be mounted on a machine by an adapter also not shown in the Figures.

Advantageously, the mounting platform 8 is a rectangular prism having a rectangular base area 83, said base area 83 being arranged in a horizontal working plane XY. Mounting platform 8 of the embodiment in FIG. 2 has four rectangular end surfaces 81, 81', 82, 82', wherein said end surfaces 81, 81', 82, 82' extend perpendicularly to the base area 83. A first coordinate axis X extends in the direction of the normal to the first end surfaces 81, 81', which are disposed in a vertical plane YZ at two of the opposite and noncontiguous ends of the mounting platform 8. A second coordinate axis Y extends in the direction of the normal to the second end surfaces 82, 82', which are disposed in a vertical plane XZ at the other two opposite and noncontiguous ends of the mounting platform 8. A third coordinate axis Y is perpendicular to the horizontal working plane XY. In other words, two first end surfaces 81, 81' are arranged to lie in a first vertical plane YZ, and two second end surfaces 82, 82' are arranged to lie in a second vertical plane XZ. The first vertical plane YZ extends obliquely to the second vertical plane XZ. The adverb "obliquely" is intended to mean an angle different from zero at which the two vertical planes YZ, XZ are inclined with respect to each other. In the center of each first end surface 81, 81' is arranged a thread for a preloading screw 10, 10' extending along the first coordinate axis X. In the center of each second end surface 82, 82' is arranged a thread for a preloading screw 10, 10' extending along the second coordinate axis Y. The base area 83 of the mounting platform 8 may be of any size but preferably has dimensions of less than/equal to 100×100 mm, preferably less than/equal to 80×80 mm, preferably less than/equal to 50×50 mm, preferably less than/equal to 25×25 mm, preferably less than/equal to 20×20 mm. A height of the mounting platform 8 is smaller than/equal to 30 mm, preferably less than/equal to 25 mm, preferably less than/equal to 20 mm. Thus, a size of the end surfaces 81, 81', 82, 82' is less than/equal to 100×30 mm, preferably less than/equal to 80×30 mm, preferably less than/equal to 50×25 mm, preferably less than/equal to 25×25 mm, preferably less than/equal to 20×20 mm.

Device 1 comprises a plurality of plates 7, 7', 7", 7''' made of mechanically durable and rigid material such as pure metals, nickel alloys, cobalt alloys, iron alloys, ceramics, plastics, etc. Advantageously, each plate 7, 7', 7", 7''' has a rectangular base area 73, said base area 73 being arranged in the horizontal working plane XY. Along the first and second coordinate axes X, Y, the plates 7, 7', 7", 7''' comprise oriented passages for preloading screws 10, 10', 10", 10'''. The base area 73 of an individual plate 7, 7", 7''' may be of any size, but is preferably smaller than/equal to 100×100 mm, preferably less than/equal to 80×80 mm, preferably less than/equal to 50×50 mm, preferably less than/equal to 25×25 mm, preferably less than/equal to 20×20 mm. A height of an individual plate 7, 7', 7", 7''' is less than/equal to 30 mm, preferably less than/equal to 25 mm, preferably less than/equal to 20 mm. Advantageously, device 1 comprises four or more plates 7, 7', 7", 7'''.

Figure 3:
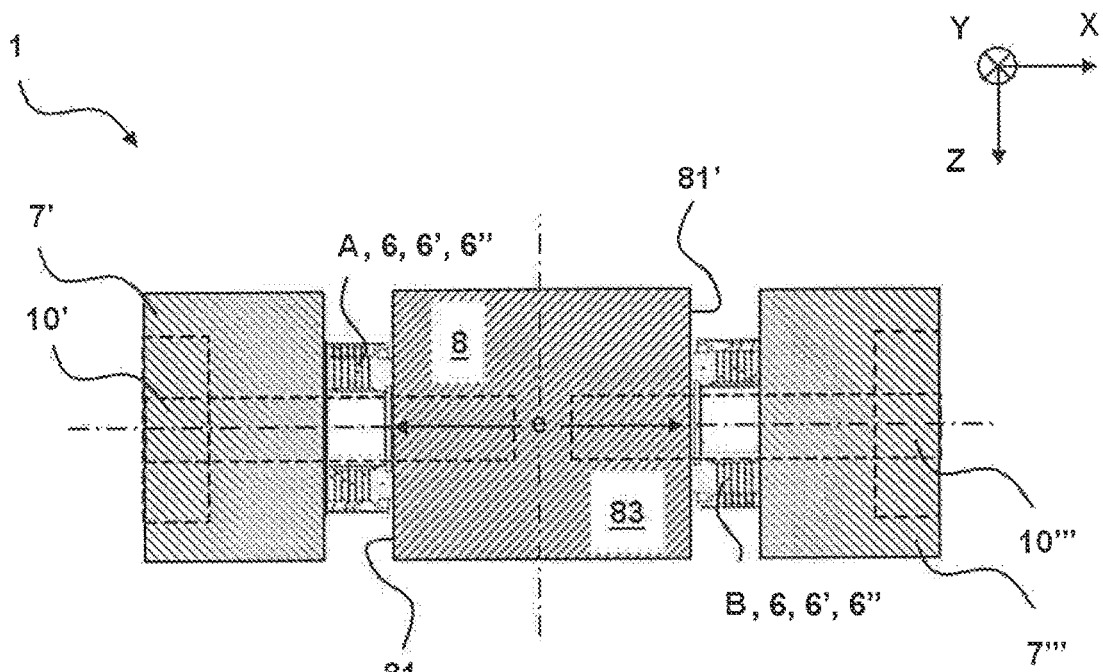
FIG. 3 is a schematic sectional view looking in the Y-direction at a cut through the X-Z plane along a horizontal coordinate axis through a portion of the first embodiment of a device according to the invention as shown in FIG. 2.

An overall base area of the device 1 is the sum of the base area 83 of the mounting platform 8 and of the base areas 73 of the four plates 7, 7', 7", 7''' and preferably is the product of sides measuring 75 mm by 75 mm for the device 1 in the embodiment shown in FIG. 3. The device for force and moment measurement known from the prior art according to data sheet 9119AA1_003_060e-01.13 has an overall base area that is the product of sides measuring 109×80 mm at a weight m'=900 g and at a height of 25 mm. Thus, the overall base area of the device 1 according to the invention is ~35% smaller compared to the overall base area of the known device. Accordingly, also a weight m of the device 1 according to the invention is ~35% less and is ~580 g. This has an impact on a natural frequency f of the device 1 according to the invention. If one assumes that device 1 according to the invention produces a linear oscillation, then the natural frequency f will be proportional to the weight m:

$$f \propto \sqrt{(1/m)}$$

A weight m of the device 1 according to the invention that is ~35% smaller than that of the known device will result in a natural frequency f of the device 1 according to the invention that is ~25% higher.

Figure 2:
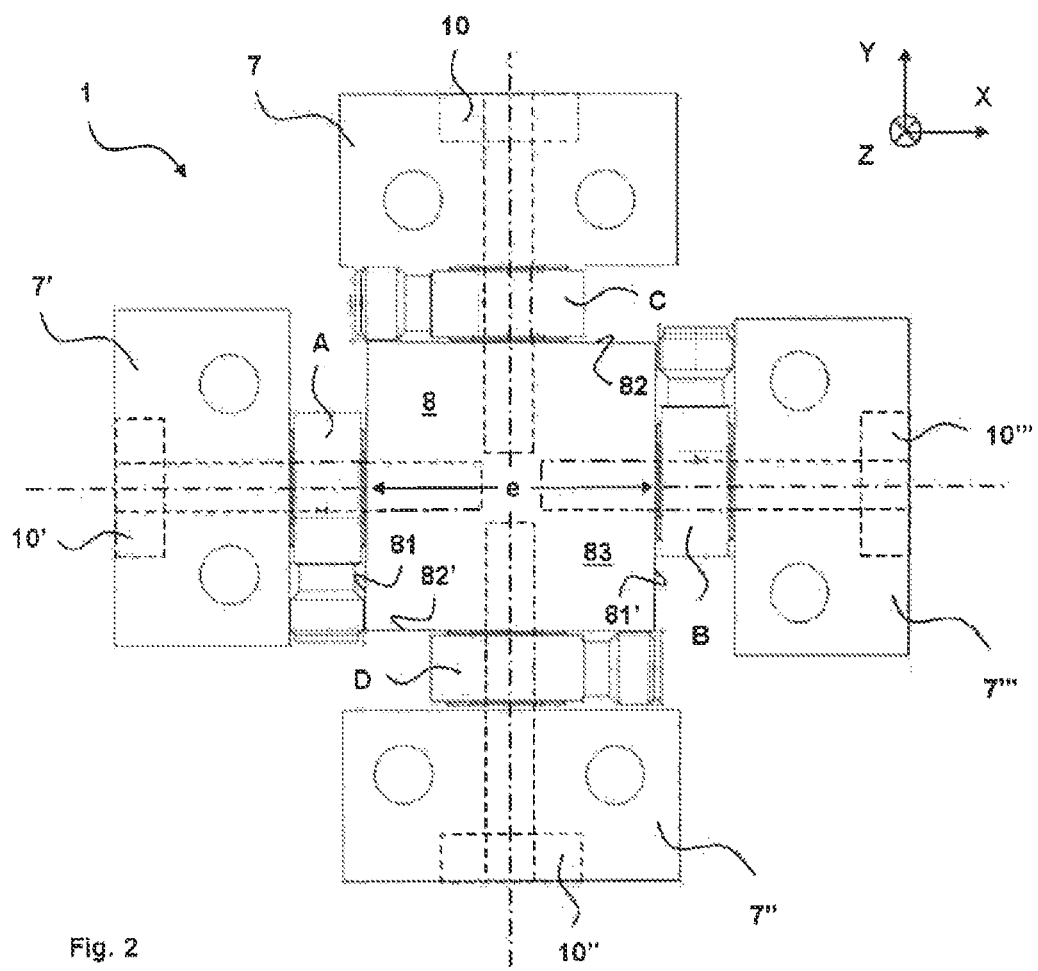
FIG. 2 is a schematic top view looking down in the Z-direction onto a portion of a first embodiment of a device according to the invention for force and moment measurement.

Device 1 comprises a plurality of piezoelectric load cells A, B, C, D. Advantageously, the piezoelectric load cells A, B, C, D have the shape of hollow cylinders comprising a central passage for respective preloading screws 10, 10' 10", 10'''. A hollow cylinder height of the piezoelectric load cells A, B, C, D is smaller than/equal to 10 mm. A hollow cylinder diameter of the piezoelectric load cells A, B, C, D is smaller than/equal to 20mm. Advantageously, device 1 comprises four piezoelectric load cells A, B, C, D. A respective piezoelectric load cell A, B, C, D is arranged at each end surface 81, 81', 82, 82' of the mounting platform 8 within the horizontal working plane XY. As shown in FIG. 2 for example, respective first and second piezoelectric load cells A, B are arranged each in the center of the respective first end surfaces 81, 81' along the first coordinate axis X. As shown in FIG. 2 for example, respective third and fourth piezoelectric load cells C, D are arranged each in the center of the respective second end surface 82, 82' along the second coordinate axis Y. As schematically shown in FIGS. 2-5 for example, piezoelectric load cells A, B, C, D are disposed at an equal distance e to each other. Thus, device 1 comprises an arrangement of four piezoelectric load cells A, B, C, D in the form of a cross in a horizontal working plane XY on a working platform 8. A utilization ratio of a sum of the areas of the hollow cylinder diameters of the piezoelectric load cells A, B, C, D to a sum of the areas of the end surfaces 81, 81', 82, 82' is greater than/equal to 25%, preferably 50%. In the embodiments shown in FIGS. 3 and 4, the size of the hollow cylinder diameters is 20mm and the size of the end surfaces 81, 81', 82, 82' is 25 x 25mm. This results in a utilization ratio of 50%. In the device for measuring forces and moments known from the prior art according to data sheet 9119AA1_003_060e-01.13, the piezoelectric load cells are arranged at only two of the four end surfaces and, furthermore, at these two end surfaces the size of the hollow cylinder diameters is less than half of the size of the end surfaces. No piezoelectric load cells are arranged at the other two of the four end surfaces. This results in a utilization ratio of less than 25%.

Figure 5:
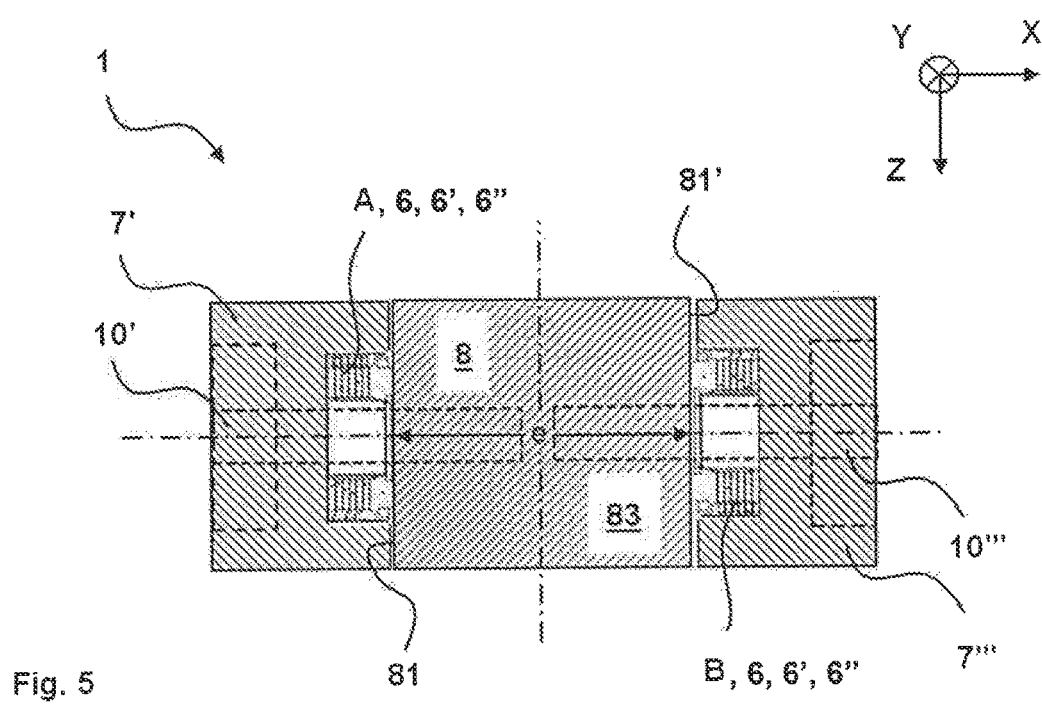
FIG. 5 is a schematic sectional view looking in the Y-direction at a cut through the X-Z plane along a horizontal coordinate axis through a portion of the second embodiment of a device according to the invention as shown in FIG. 4.
Figure 4:
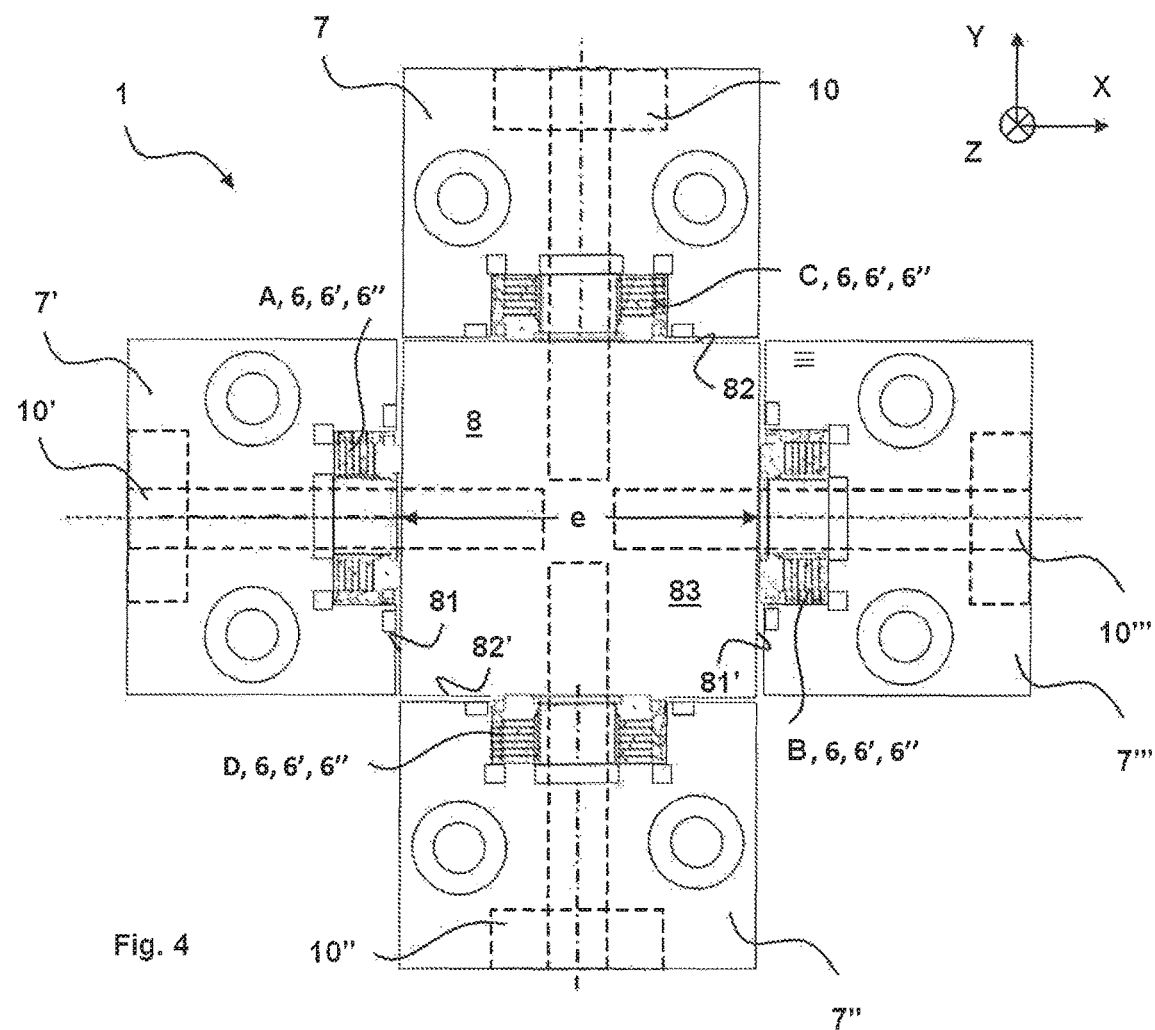
FIG. 4 is a schematic top view looking down in the Z-direction onto a portion of a second embodiment of a device according to the invention for force and moment measurement.

In the first embodiment of the device 1 as shown in FIGS. 2 and 3, the piezoelectric load cells A, B, C, D are arranged on flat end surfaces 81, 81', 82, 82'. In the second embodiment of the device 1 as shown in FIGS. 4 and 5, the piezoelectric load cells A, B, C, D are arranged in recesses of the end surfaces 81, 81', 82, 82'. The piezoelectric load cells A, B, C, D are arranged to be substantially completely accommodated in recesses of the end surfaces 81, 81', 82, 82'. In this respect, the adverb "substantially" is intended to mean that a piezoelectric load cell A, B, C, D fits into a recess with a variation of ±10%. In comparison to the first embodiment according to FIGS. 2 and 3, the arrangement of the piezoelectric load cells A, B, C, D in recesses of the end surfaces 81, 81', 82, 82' as shown in FIGS. 4 and 5 reduces the outer dimension of the device 1 by a multiple of the hollow cylinder height of the piezoelectric load cells A, B, C, D. Furthermore, the recesses in the end surfaces 81, 81', 82, 82' reduce the weight of the mounting platform 8. In comparison to the embodiment shown in FIG. 2, the reduction in outer dimension of the device 1 and the reduction in weight m of the mounting platform 8 of the embodiment shown in FIG. 5 results in a higher natural frequency f of the device 1 than in the embodiment shown in FIG. 3.

The piezoelectric load cells A, B, C, D are arranged on the mounting platform 8 under mechanical preloading. For this purpose, the first piezoelectric load cells A, B are mechanically preloaded against the first end surfaces 81, 81' along the first coordinate axis X by means of first and second preloading screws 10, 10'. The second piezoelectric load cells C, D are mechanically preloaded against the second end surfaces 82, 82' along the second coordinate axis Y by means of third and fourth preloading screws 10", 10'''. The preloading screws 10, 10' 10", 10' are made mechanically durable and rigid material such as pure metals, nickel alloys, cobalt alloys, iron alloys, ceramics, plastics, etc. The preloading screws 10, 10' 10", 10''' pass through the center of the passages in the plates 7, 7', 7", 7''' and the central passages of the piezoelectric load cells A, B, C, D are screwed in the threads of the end surfaces 81, 81', 82, 82' of the mounting platform 8. Screw heads of the preloading screws 10, 10' 10", 10''' are embedded in the passages of the plates 7, 7', 7", 7'''. The piezoelectric load cells A, B, C, D and the mounting platform 8 are supported at the plates 7, 7', 7", 7''' by means of the preloading screws 10, 10' 10", 10'''. Due to this mechanical preloading, a force F can be detected as a compressive force or as a tensile force. As schematically shown in FIGS. 3 and 5 for example, mechanical preloading also ensures a very good electrical contact between the piezoelectric transducers 6, 6', 6" and electrodes.

As schematically shown in FIG. 4 for example, each piezoelectric load cell A, B, C, D comprises a plurality of piezoelectric transducers 6, 6', 6". The piezoelectric transducers 6, 6', 6" are cylindrical in shape and made of a piezoelectric crystal material such as quartz ($SiO_2$ single crystal), calcium gallo germanate ($Ca_3Ga_2Ge_4O_{14}$ or CGG), langasite ($La_3Ga_5SiO_{14}$ or LGS), tourmaline, gallium orthophosphate, etc. The piezoelectric transducers 6, 6', 6" are cut in a crystallographic orientation that provides a high sensitivity for a force F to be detected or a moment M to be detected. The crystallographic orientation providing this high sensitivity is referred to as the polarization direction. The piezoelectric transducers 6, 6', 6" of the piezoelectric load cells A, B are arranged along the first coordinate axis X with opposite directions of polarization, the piezoelectric transducers 6, 6', 6" of the piezoelectric load cells C, D are arranged along the second coordinate axis Y with opposite directions of polarization.

Advantageously, the orientation of the surfaces of the piezoelectric transducers 6, 6', 6" is such that negative and positive electrical polarization charges are generated on those surfaces onto which a force F acts. In the case of a mechanical load, the force F will act as a compressive force and negative polarization charges will be generated; in the case of a mechanical relief, the force F will act as a tensile force and positive polarization charges will be generated. The force F may be a normal force or a shear force. Thus, a distinction is made between a longitudinal effect and a shear effect. The longitudinal effect leads to the generation of electric polarization charges on surfaces where the surface normal is parallel to an effective axis of the normal force. The shear effect leads to the generation of electrical polarization charges on surfaces where the surface normal is perpendicular to an effective axis of the shear force. Advantageously, as schematically shown in FIG. 4 for example, each load cell A, B, C, D comprises three piezoelectric transducers 6, 6', 6".

Each piezoelectric transducer 6, 6', 6" detects one of the three force components $F_x$, $F_y$, $F_z$ that when taken together define the force F. In the first piezoelectric load cells A, B extending along the first coordinate axis X, a first piezoelectric transducer 6 detects a first force component $F_x$ by means of the longitudinal effect, a second piezoelectric transducer 6' detects a second force component $F_y$ by means of the shear effect, and a third piezoelectric transducer 6" detects a third force component $F_z$ by the shear effect. In the second piezoelectric load cells C, D extending along the second coordinate axis Y, the first piezoelectric transducer 6 detects the first force component $F_x$ by the shear effect, said second piezoelectric transducer 6' detects the second force component $F_y$ by the longitudinal effect and the third piezoelectric transducer 6" detects the third force component $F_z$ by the shear effect. Thus, the two force components $F_x$, $F_y$ of the horizontal working plane XY are detected by the shear effect on the one hand and by the longitudinal effect on the other hand. In this way, device 1 shows isotropic sensitivity in the horizontal working plane XY.

Device 1 has compressive strength parallel to the effective axis of a normal force and has shear stiffness parallel to the effective axis of a shear force. The shear force acts perpendicularly to the normal force. It is known, however, that the compressive strength is higher than the shear stiffness. Thus, data sheet 9017C_000-960d-01.14 states a compressive strength of ~1400 N/μm and a shear stiffness of ~300 N/μm for a three-component force sensor comprising three piezoelectric load cells. Accordingly, the compressive strength of device 1 according to the invention is ~4.7 times as high as its shear stiffness. The four piezoelectric load cells A, B, C, D of device 1 are arranged in the form of a cross in the horizontal working plane XY on the working platform 8. A stiffness is the sum of compressive strength and shear stiffness. Along the first coordinate axis X, the stiffness is the sum of the compressive strength of the two piezoelectric load cells A, B and the shear stiffness of the two piezoelectric load cells C, D. Along the second coordinate axis Y, the stiffness is the sum of the compressive strength of the two piezoelectric load cells C, D and the shear stiffness of the two piezoelectric load cells A, B. Thus, the stiffness of device 1 according to the invention is isotropic in the horizontal working plane XY.

In this respect, device 1 according to the invention differs from the device for force and moment measurement known from the prior art as described in the document EP0806643A2. This known device teaches to arrange all four piezoelectric load cells A, B along a coordinate axis Y of a horizontal working plane XY. Along the Y coordinate axis, the stiffness is equal to the sum of the compressive strengths of the four piezoelectric load cells A, B. Along the X coordinate axis, the stiffness is equal to the sum of the shear stiffnesses of the four piezoelectric load cells A, B. Thus, the stiffness of the known device is higher along the Y coordinate axis than along the X coordinate axis. The stiffness of the known device is therefore anisotropic in the horizontal working plane XY.

The isotropic stiffness of device 1 according to the invention has an impact on the natural frequency f. Thus, the device for force and moment measurement known from the prior art according to data sheet 9119AA1_003_060e-01:13 has anisotropic natural frequencies of ~6.0 kHz for force component $F_x$ and of ~6.4 kHz for force component $F_y$. If machining is carried out in a rotationally symmetrical manner in the horizontal working plane XY and the natural frequencies are anisotropic as in the prior art device, an actual natural frequency is determined by the lower natural frequency of the X coordinate axis. Thus, the natural frequency f of the device 1 according to the invention is isotropic in the horizontal working plane XY.

Advantageously, the piezoelectric transducers 6, 6', 6" of the piezoelectric load cells A, B, C, D are disc-shaped and comprise a central passage. A height of the disc surface of the piezoelectric transducers 6, 6', 6" is about ten times less than a disc diameter of the piezoelectric transducers 6, 6', 6". The force F is introduced via two surfaces of the piezoelectric transducers 6, 6', 6". These surfaces are in the plane of the disc diameter of the piezoelectric transducers 6, 6', 6". Each surface is associated with an electrode for picking up the electric polarization charges. The electrodes are not shown in the Figures. The electrodes are made of electrically conductive metal such as steel, copper, copper alloys, etc. Each electrode makes a two-dimensional electrical contact with the associated surface. Advantageously, the electrodes are disc-shaped and comprise a central passage. Each of the piezoelectric transducers 6, 6', 6" is arranged between two electrodes that are associated with the opposite surfaces of the respective piezoelectric transducer. These electrodes are subdivided in signal electrodes and counter electrodes. An electrode that is associated with a surface of a piezoelectric transducer 6, 6', 6" that also faces the mounting platform 8 serves as the signal electrode. Electric polarization charges picked up from the signal electrode are used as the signal. An electrode associated with a surface of a piezoelectric transducer 6, 6", 6' that faces away from the mounting platform 8 serves as the counter electrode. The counter electrode is at ground potential.

Each piezoelectric load cell A, B, C, D comprises a cylindrical housing made of mechanically durable and rigid material such as pure metals, nickel alloys, cobalt alloys, iron alloys, ceramics, plastics, etc. Advantageously, the housing is a hollow cylinder having a central passage. The housing comprises an inner circumferential surface, an outer circumferential surface and two base areas. The piezoelectric transducers 6, 6', 6" of each piezoelectric load cell A, B, C, D are arranged in the space between the inner circumferential surface and the outer circumferential surface of each housing. The piezoelectric transducers 6, 6', 6" are stacked on top of each other. The electrodes of the stacked piezoelectric transducer elements are electrically insulated against each other and against the housing by insulators. Advantageously, the insulators are disc-shaped having a central passage. The insulators are not shown in the Figures. The housing of each of the piezoelectric load cells A, B, C, D protects the piezoelectric transducers 6, 6', 6", electrodes and insulators from shocks and impacts that may occur during operation. Furthermore, the housing also protects the piezoelectric transducers 6, 6', 6", electrodes and insulators from harmful influences from the surrounding environment such as impurities (dust, humidity, etc.). Finally, the housing protects the piezoelectric transducers 6, 6 6", electrodes and insulators from electric and electromagnetic interference effects in the form of electromagnetic radiation.

Figure 6:
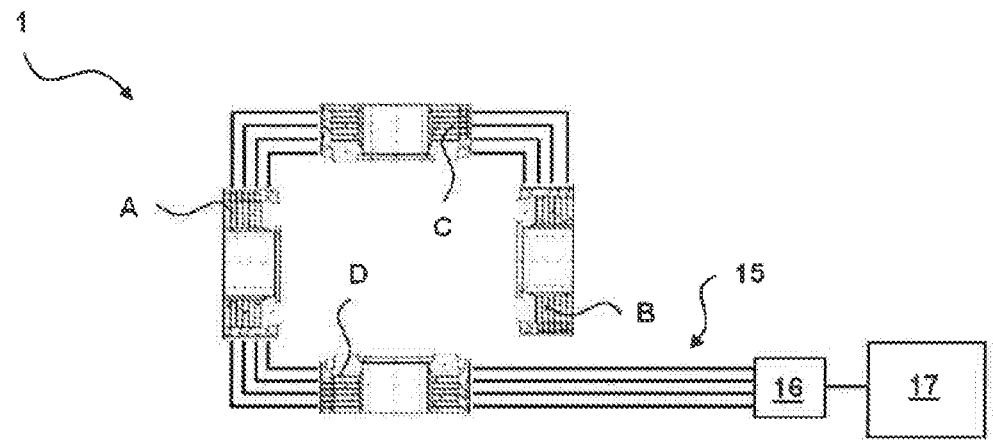
FIG. 6 is a schematic view of a first embodiment of a signal pickup and transmission of the device according to an embodiment of the invention as shown in FIGS. 2 to 5.
Figure 7:
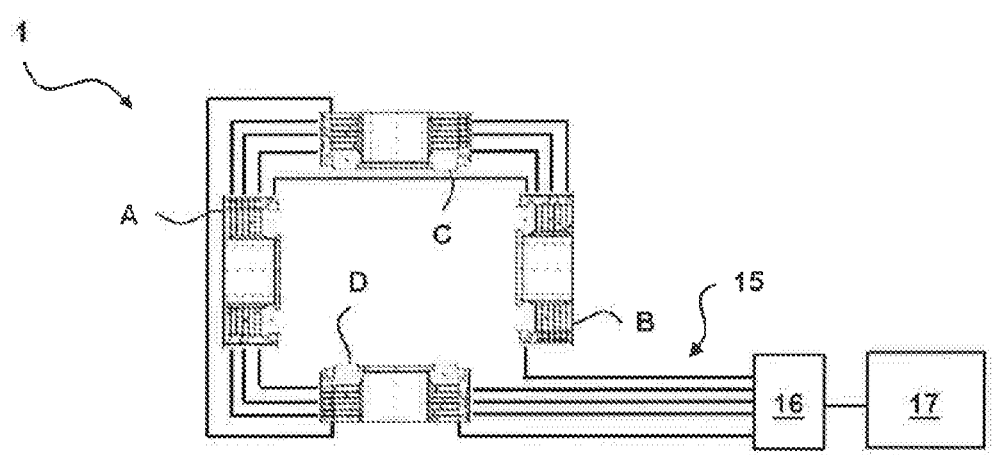
FIG. 7 is a schematic view of a second embodiment of a signal pickup and transmission of the device according to an embodiment of the invention as shown in FIGS. 2 to 5.
Figure 8:
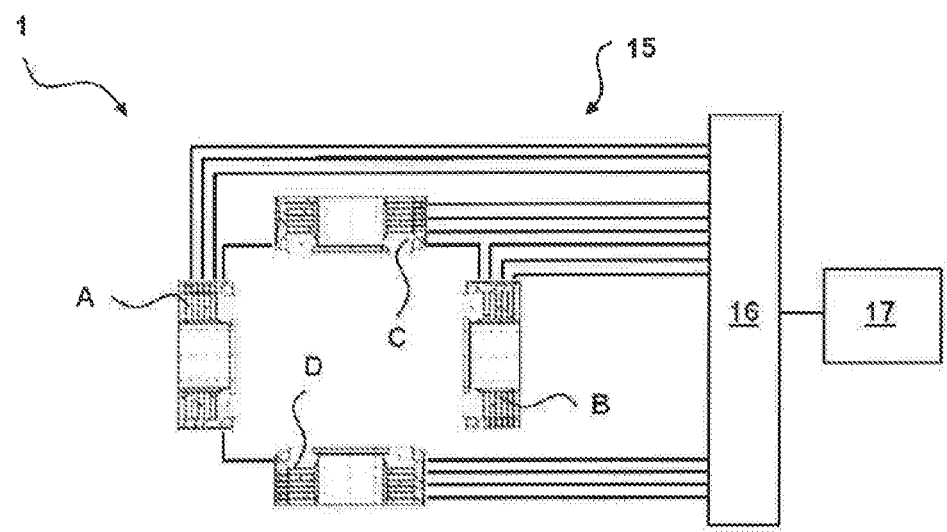
FIG. 8 is a schematic view of a third embodiment of a signal pickup and transmission of the device according to an embodiment of the invention as shown in FIGS. 2 to 5.

FIGS. 6 to 8 schematically illustrate three embodiments of a signal pickup and transmission of the device 1. The transmission of the electric polarization charges picked up from the electrodes occurs from each housing of the piezoelectric load cells A, B, C, D via electrical feedthroughs and outside of each housing via signal lines 15 to a charge amplifier 16 and from there to an evaluation unit 17. Advantageously, each piezoelectric load cell A, B, C, D is electrically contacted by four signal lines 15. Signals of the signal electrodes of the three piezoelectric transducers 6, 6', 6" of each of the piezoelectric load cells A, B, C, D are transmitted by three signal lines 15. The counter electrodes of the three piezoelectric transducers 6, 6', 6" are grounded at a common potential via a fourth signal line 15.

In the first embodiment of a signal pickup and transmission according to FIG. 6, the signal electrodes and the counter electrodes are contacted in series. Advantageously, the signal electrodes and the counter electrode of the four piezoelectric load cells A, B, C, D are in electrical contact with each other via three signal lines 15 in the form of plug-in contacts. The signal electrodes associated with the first piezoelectric transducers 6 are electrically contacted with each other in series and transmit, via a signal line 15, a signal that is a sum of the electric polarization charges proportional to the first force component $F_x$:

$$F_x = F_{xA} + F_{xB} + F_{xC} + F_{xD}$$

wherein the second index of the subscript to the force component $F_x$ in the equation above indicates the piezoelectric load cell A, B, C, D. Similarly, the signal electrodes associated with the second piezoelectric transducers 6' are electrically contacted with each other in series and transmit, via a signal line 15, a signal that is a sum of the electric polarization charges proportional to the second force component $F_y$:

$$F_y = F_{yA} + F_{yB} + F_{yC} + F_{yD}$$

The signal electrodes associated with the third piezoelectric transducers 6" are electrically contacted with each other in series and transmit, via a signal line 15, a signal that is a sum of the electric polarization charges proportional to the force component $F_z$:

$$F_z = F_{zA} + F_{zB} + F_{zC} + F_{zD}$$

The device 1 comprising these signal electrodes contacted in series is a three-component transducer of the three force components $F_x$, $F_y$, $F_z$ of the force F.

In the second embodiment of a signal pickup and transmission according to FIG. 7, the signal electrodes and counter electrodes are contacted partially in series and partially in parallel. Advantageously, the signal electrodes and the counter electrode of the four piezoelectric load cells A, B, C, D are electrically contacted with each other by four signal lines 15 in the form of plug contacts. Two first signal electrodes associated with the first piezoelectric transducers 6 are electrically contacted with each other in series and transmit, via a signal line 15, a signal that is a sum of the electric polarization charges proportional to the first force component $F_x$:

$$F_x = F_{xC} + F_{xD}$$

Two first signal electrodes associated with the second piezoelectric transducers 6' are electrically contacted with each other in series and transmit, via a signal line 15, a signal that is a sum of the electric polarization charges proportional to the second force component $F_y$:

$$F_y = F_{yA} + F_{yB}$$

Two further signal electrodes associated with the first piezoelectric transducers 6 and two further signal electrodes associated with the second piezoelectric transducers 6' are electrically contacted with each other in series and transmit, via a signal line 15, a signal that is a sum of the electric polarization charges proportional to a third moment component $M_z$ of a moment M:

$$M_z = F_{xA} + F_{xB} + F_{yC} + F_{yD}$$

The signal electrodes associated with the third piezoelectric transducers 6" are electrically contacted with each other in series and transmit, via a signal line 15, a signal that is a sum of the electric polarization charges proportional to the third force component $F_z$:

$$F_z = F_{zA} + F_{zB} + F_{zC} + F_{zD}$$

The counter electrodes of the three piezoelectric transducers 6, 6', 6" are grounded at a common potential via a fourth signal line 15. The device 1 comprising these signal electrodes that are partially contacted in series and partially contacted in parallel is a four-component transducer of the three force components $F_x$, $F_y$, $F_z$ of the force F and of the moment component $M_z$ of a moment M.

In the third embodiment of a signal pickup and transmission according to FIG. 8, the signal electrodes associated with the piezoelectric transducers 6, 6', 6" are contacted in parallel, while the counter electrodes are contacted in series. Electric polarization charges of each of the three piezoelectric transducers 6, 6', 6" of the four piezoelectric load cells A, B, C, D are picked up by the signal electrodes and transmitted as individual signals via twelve signal lines 15. The device 1 comprising these signal electrodes contacted in parallel is a twelve-component transducer. The individual signals are electrically amplified in the charge amplifier 16 and transmitted to the evaluation unit 17. The amplified signals are processed in the evaluation unit 17. Thus, the signals for measuring the force components $F_x$, $F_y$, $F_z$ of the force F can be correlated as follows:

$$F_x = F_{xA} + F_{xB} + F_{xC} + F_{xD}$$

$$F_y = F_{yA} + F_{yB} + F_{yC} + F_{yD}$$

$$F_z = F_{zA} + F_{zB} + F_{zC} + F_{zD}$$

wherein the second index indicates the piezoelectric load cell A, B, C, D. Furthermore, the signals for measuring the moment components $M_x$, $M_y$, $M_z$ of a moment M with respect to the center of the mounting platform 8 can be correlated as follows:

$$M_x = e/2 * (-F_{zA} + F_{zB})$$

$$M_y = e/2 * (-F_{zC} + F_{zD})$$

$$M_z = e/2 * (F_{xA} + F_{xB} + F_{yC} + F_{yD})$$

wherein e is the distance of the piezoelectric load cells A, B, C, D from each other as schematically shown in FIGS. 2-5.

Those skilled in the art and knowing the present invention can make variations without departing from the scope of the invention. Thus, those skilled in the art may provide a mounting platform having only three end surfaces or a mounting platform having five or more end surfaces. Furthermore, instead of using piezoelectric crystal material those skilled in the art may use piezoelectric ceramics such as lead zirconate titanate (PZT), etc., or piezoelectric film such as polyvinylidene fluoride (PVDF), etc., for the piezoelectric transducer. In addition, those skilled in the art may provide more than one piezoelectric load cell at one end surface of a mounting platform.

LIST OF REFERENCE NUMERALS

A, B, C, D piezoelectric load cell
e distance
f natural frequency
F force
$F_x$, $F_y$, $F_z$ force component
m, m' weight
M moment
$M_x$, $M_y$, $M_z$ moment component
X, Y, Z coordinate axis
XY horizontal working plane
YZ, XZ vertical plane
1 device
4 workpiece
5 tool
6, 6', 6" piezoelectric transducers
7, 7', 7", 7''' plate
8 mounting platform
9 stand
10, 10', 10", 10''' preloading screw
15 signal line
16 charge amplifier
17 evaluation unit
73 base area of plate
81, 81' first end surface
82, 82' second end surface
83 base area of mounting platform

The invention claimed is:

1. A device for force and moment measurement, comprising:
   a mounting platform having a plurality of end surfaces that include a first end surface and a second end surface disposed perpendicularly with respect to the first end surface;
   a first coordinate axis extends in a direction that is normal to the first end surface;
   a second coordinate axis extends in a direction that is normal to the second end surface;
   a plurality of piezoelectric load cells for detecting force components ($F_x$, $F_y$, $F_z$) and including a first piezoelectric load cell and a second piezoelectric load cell, each of the plurality of piezoelectric load cells being disposed in a horizontal working plane (XY) and mechanically preloaded against a respective one of the plurality of end surfaces of the mounting platform, wherein the first piezoelectric load cell is preloaded against the first end surface of the mounting platform, and wherein the second piezoelectric load cell is preloaded against the second end surface of the mounting platform;
   a first piezoelectric load cell of the plurality thereof is arranged at the first end surface;
   a second piezoelectric load cell of the plurality thereof is arranged at the second end surface;
   said first piezoelectric load cell is configured to measure a first force component ($F_x$) by a longitudinal effect and a second force component ($F_y$) by a shear effect;
   wherein said second piezoelectric load cell is configured to measure the first force component ($F_x$) by the shear effect and the second force component ($F_y$) by the longitudinal effect; and
   wherein each respective piezoelectric load cell is mechanically preloaded by a respective single preloading screw that is screwed in a respective thread defined in the respective end surface.

2. The device according to claim 1, wherein each of the first force component ($F_x$) and the second force component (Fy) are detected on the one hand by the shear effect and on the other hand by the longitudinal effect whereby the device has isotropic sensitivity in the horizontal working plane.

3. The device according to claim 1, wherein the first piezoelectric load cell is configured to measure a third force component by the shear effect; and wherein the second piezoelectric load cell is configured to measure the third force component by the shear effect.

4. The device according to claim 1, wherein the mounting platform is a cuboid comprising a rectangular base area, said base area being arranged in a horizontal working plane; wherein the plurality of end surfaces of said mounting platform comprises four rectangular end surfaces, each of said four rectangular end surfaces extending perpendicularly to the base area; and wherein two of said four rectangular end surfaces are arranged in a first vertical plane and two of said four rectangular end surfaces are arranged in a second vertical plane.

5. The device according to claim 4, wherein a piezoelectric load cell is arranged at each of the four rectangular end surfaces or wherein a load cell is arranged in the center of each of the four rectangular end surfaces.

6. The device according to claim 5, wherein the piezoelectric load cells are arranged at an equal distance to each other and/or the piezoelectric load cells are arranged on the working platform in the form of a cross.

7. The device according to claim 5, wherein a utilization ratio of a sum of areas of hollow cylinder diameters of the piezoelectric load cells to a sum of areas of the end surfaces is greater than/equal to 25%.

8. The device according to claim 5, wherein each piezoelectric load cell defines a central passage therethrough, and each respective piezoelectric load cell is mechanically preloaded by a respective preloading screw passing through the center of the central passage of the respective piezoelectric load cell.

9. The device according to claim 5, wherein the piezoelectric load cells are arranged in recesses in the four rectangular end surfaces.

10. The device according to claim 9, wherein a stiffness along the first coordinate axis is a sum of a compressive strength of the piezoelectric load cells and a shear stiffness of the piezoelectric load cells; the stiffness along the second coordinate axis is a sum of the compressive strength of the piezoelectric load cells and the shear stiffness of the piezoelectric load cells whereby the device has an isotropic stiffness in the horizontal working plane; and in that a natural frequency of the device is isotropic in the horizontal working plane.

11. The device according to claim 9, further comprising a first signal line, a second signal line and a third signal line; wherein each piezoelectric load cell comprises a plurality of piezoelectric transducers; a force to be detected and/or a moment to be detected acting on surfaces of said piezoelectric transducers generates electric polarization charges on these surfaces; wherein each of the plurality of piezoelectric transducers includes a respective signal electrode electrically connected to the respective surface of the respective piezoelectric transducer, said signal electrodes being configured for picking up the electrical polarization charges; and wherein the first, second and third signal lines transmit the picked up electric polarization charges as signals.

12. The device according to claim 11, wherein
   the signal electrodes electrically connected to first ones of the plurality of piezoelectric transducers are electrically connected with each other in series and configured to transmit, via the first signal line, a signal that is a sum of the electrical polarization charges proportional to the first force component of the force;
   the signal electrodes electrically connected to second ones of the plurality of piezoelectric transducers are electrically connected with each other in series and configured to transmit, via the second signal line, a signal that is a sum of the electric polarization charges proportional to the second force component of the force; and
   the signal electrodes electrically connected to third ones of the plurality of piezoelectric transducers are electrically connected with each other in series and configured to transmit, via the third signal line, a signal that is a sum of the electric polarization charges proportional to the third force component of the force.

13. The device according to claim 12, wherein
   two first signal electrodes associated with the first piezoelectric transducers are electrically contacted with each other in series and transmit, via a signal line, a signal that is a sum of the electrical polarization charges proportional to the first force component of the force;
   two second signal electrodes associated with the second piezoelectric transducers are electrically contacted with each other in series and transmit, via a signal line, a signal that is a sum of the electric polarization charges proportional to the second force component of the force;

two further signal electrodes associated with the first piezoelectric transducers and two further signal electrodes associated with the second piezoelectric transducers are electrically contacted with each other in series and transmit, via a signal line, a signal that is a sum of the electric polarization charges proportional to a third moment component of a moment; and that the signal electrodes associated with the third piezoelectric transducers are electrically contacted with each other in series and transmit, via a signal line, a signal that is a sum of the electrical polarization charges proportional to the force component of the force.

14. The device according to claim 11, wherein the signal electrodes are electrically connected in parallel.

* * * * *